US008928653B2

(12) United States Patent
Mizutani et al.

(10) Patent No.: US 8,928,653 B2
(45) Date of Patent: Jan. 6, 2015

(54) INFORMATION PROCESSING SYSTEM, INFORMATION PROCESSING METHOD, AND COMPUTER-READABLE STORAGE MEDIUM HAVING INFORMATION PROCESSING PROGRAM STORED THEREIN

(75) Inventors: Shohei Mizutani, Kyoto (JP); Masayoshi Kobayashi, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 604 days.

(21) Appl. No.: 13/179,811

(22) Filed: Jul. 11, 2011

(65) Prior Publication Data

US 2012/0287118 A1 Nov. 15, 2012

(30) Foreign Application Priority Data

May 13, 2011 (JP) .................................. 2011-108326

(51) Int. Cl.
*G06T 15/00* (2011.01)
*H04N 13/02* (2006.01)
*H04N 13/00* (2006.01)
*H04N 13/04* (2006.01)
*H04N 19/597* (2014.01)
*H04N 19/40* (2014.01)
*H04N 21/2743* (2011.01)
*H04N 21/414* (2011.01)
*H04N 21/4402* (2011.01)
*H04N 21/81* (2011.01)

(52) U.S. Cl.
CPC ....... *H04N 13/0239* (2013.01); *H04N 13/0029* (2013.01); *H04N 13/0404* (2013.01); *H04N 13/0409* (2013.01); *H04N 19/00769* (2013.01); *H04N 19/00472* (2013.01); *H04N 21/2743* (2013.01); *H04N 21/41407* (2013.01); *H04N 21/440218* (2013.01); *H04N 21/8153* (2013.01); *G06F 2221/2109* (2013.01); *G06F 2221/2119* (2013.01)
USPC ............................................................ 345/419

(58) Field of Classification Search
CPC .......... G06K 7/1095; G06K 19/06037; G06K 19/06028; G06K 7/1417; H04N 2201/0067; H04N 2201/0068; H04N 1/00307; H04N 1/32122; H04N 13/0048; H04N 13/007; H04N 13/0055; H04N 13/026; H04N 19/00781; H04N 19/00884; H04N 13/0003; H04N 9/8047; H04N 19/00775; G06T 7/0075; G06T 2207/10012; G06T 2207/10021
USPC ........................................................ 345/419
See application file for complete search history.

(56) References Cited

U.S. PATENT DOCUMENTS 8,358,329 B2 * 1/2013 Sekizawa et al. ............... 348/36
2008/0018731 A1 * 1/2008 Era ................................. 348/51
(Continued)

FOREIGN PATENT DOCUMENTS

JP 2005-130021 5/2005
JP 2005-309756 11/2005
(Continued)

*Primary Examiner* — Kee M Tung
*Assistant Examiner* — Haixia Du
(74) *Attorney, Agent, or Firm* — Nixon & Vanderhye P.C.

(57) ABSTRACT

In a first information processing apparatus, data in a first format is stored. Further, the data in the first format is transformed into a code image by using a predetermined encoding mode. Moreover, code image data in a second format is generated by combining the code image with the data in the first format. In a second information processing apparatus, predetermined information processing is performed based on the data in the first format. In a third information processing apparatus, the code image is displayed, by a first display device, based on the code image data in the second format.

12 Claims, 8 Drawing Sheets

(56) References Cited

U.S. PATENT DOCUMENTS

2008/0158369 A1 7/2008 Watanabe
2010/0202535 A1* 8/2010 Fang et al. ............... 375/240.16
2012/0030725 A1 2/2012 Seno et al.

FOREIGN PATENT DOCUMENTS

| JP | 2006139349 | 6/2006 |
| JP | 2008-167064 | 7/2008 |
| JP | 2008259008 | 10/2008 |
| WO | 2010119834 | 10/2010 |

* cited by examiner

INFORMATION PROCESSING SYSTEM, INFORMATION PROCESSING METHOD, AND COMPUTER-READABLE STORAGE MEDIUM HAVING INFORMATION PROCESSING PROGRAM STORED THEREIN

CROSS REFERENCE TO RELATED APPLICATION

The disclosure of Japanese Patent Application No. 2011-108326, filed on May 13, 2011, is incorporated herein by reference.

BACKGROUND OF THE INVENTION

1. Field of the Invention

The present invention relates to an information processing system including a first information processing apparatus, a second information processing apparatus, and a third information processing apparatus, and more particularly to an information processing system capable of generating and obtaining data in a format which can be processed by an information processing apparatus having a specific reproduction function.

2. Description of the Background Art

Conventionally, technology is known for transmitting, to a server, an image photographed by a hand-held terminal device, receiving, from the server, a stereoscopically viewable image generated by the server, and displaying the stereoscopically viewable image on a display of the hand-held terminal device (for example, Japanese Laid-Open Patent Publication No. 2005-130021).

In the technology described in Japanese Laid-Open Patent Publication No. 2005-130021, in order to display the stereoscopically viewable image by means of a hand-held terminal device which can perform stereoscopic display and is not connected to a server, data of the stereoscopically viewable image needs to be obtained particularly by using communication means which is wirelessly connected to or wire-connected to another hand-held terminal device connected to the server,. Namely, the hand-held terminal device described in Japanese Laid-Open Patent Publication No. 2005-130021 cannot obtain the stereoscopically viewable image by means of a simple configuration when the stereoscopically viewable image cannot be directly obtained.

SUMMARY OF THE INVENTION

Therefore, an object of the present invention is to make available an information processing system which allows data, such as stereoscopically viewable image data, which requires a specific reproduction function to be obtained by a device having the function of reproducing such data, in a simple configuration, with enhanced ease.

In order to attain the afore-mentioned object, the present invention has the following features.

An information processing system according to the present invention is an information processing system including a first information processing apparatus, a second information processing apparatus, and a third information processing apparatus, and the first information processing apparatus includes storage means and code image generation means. The storage means stores data in a first format which can be processed by the first information processing apparatus and the second information processing apparatus. The code image generation means transforms the data in the first format into at least one code image by using a predetermined encoding mode, and generates code image data in a second format which can be processed by a general-purpose device including the third information processing apparatus, Further, the second information processing apparatus includes information processing means for performing predetermined information processing based on the data in the first format. The third information processing apparatus includes code image display means for displaying the at least one code image by a first display device, based on the code image data in the second format.

In the configuration described above, for a user of a device which can process the data in the first format, opportunities for obtaining the data in the first format can be expanded. As a result, distribution of the data in the first format can be promoted.

In another exemplary configuration, the second information processing apparatus may further include: imaging means for taking an image of a photographed subject which is to be photographed; and decoding means for decoding, when the photographed subject the image of which has been taken by the imaging means contains the at least one code image, the at least one code image, and obtaining the data in the first format. The information processing means may perform the predetermined information processing based on the data in the first format which has been obtained by the decoding means.

In the exemplary configuration described above, for example, even an information processing apparatus having no network connecting function (that is, even a terminal which cannot directly obtain the data in the first format via a network or the like) can obtain the data in the first format by using the imaging means, and can perform information processing based on the data.

In still another exemplary configuration, the second information processing apparatus may include selection means capable of selecting one of a first mode and a second mode according to an operation performed by a user, and the information processing means may perform the predetermined information processing based on the data in the first format when the selection means selects the first mode, and perform, when the selection means selects the second mode, the predetermined information processing based on the data in the first format which has been obtained by decoding, by the decoding means, the at least one code image contained in the image taken by the imaging means.

In the exemplary configuration described above, when the second information processing apparatus holds the data in the first format, the information processing based on the data in the first format can be performed by using the first mode without performing the decoding process or the like. Even when the second information processing apparatus does not hold the data in the first format, the information processing based on the data in the first format can be performed by using a second mode. Thus, an environment can be provided which enables various executions of the information processing based on the data in the first format.

In still another exemplary configuration, the first information processing apparatus may include general-purpose file generation means for generating a general-purpose file in a format which can be processed by a device including the third information processing apparatus, the general-purpose file containing the data in the first format and the code image data in the second format. The information processing means of the second information processing apparatus may perform the predetermined information processing, based on the data in the first format which is contained in the general-purpose file generated by the general-purpose file generation means.

The code image display means of the third information processing apparatus may display the at least one code image by using the first display device, based on the code image data in the second format which is contained in the general-purpose file generated by the general-purpose file generation means.

In the exemplary configuration described above, the data in the first format and the data in the second format can be handled as one general-purpose file.

In still another exemplary configuration, the general-purpose file generation means of the first information processing apparatus may generate the general-purpose file containing the data in the first format, the code image data in the second format, and associated data indicating that contents represented by the data in the first format are contained. The second information processing apparatus may further include: general-purpose file obtaining means for obtaining the general-purpose file; and determination means for determining whether the general-purpose file obtained by the general-purpose file obtaining means contains the associated data. The information processing means may perform, when the determination means determines that the general-purpose file contains the associated data, the predetermined information processing based on the data in the first format which is contained in the general-purpose file having been obtained, without using the code image data in the second format which is contained in the general-purpose file having been obtained.

In the exemplary configuration described above, one of two kinds of data (the data in the first format and the code image data in the second format) in the general-purpose file can be determined, based on the associated data, as data to be used for reproducing the data in the first format, thereby enabling alleviation of load of process for reproduction.

In still another exemplary configuration, the data in the first format may be stereoscopically viewable image data representing a stereoscopically viewable image of the photographed subject, and the information processing means of the second information processing apparatus may display the stereoscopically viewable image by using a second display device based on the data in the first format.

In the exemplary configuration described above, the data in the first format (for example, a stereoscopically viewable image) can be obtained with enhanced ease, and use of the information processing apparatus (for example, a stereoscopically viewable image viewer) capable of performing information processing using the data in the first format can be promoted.

In still another exemplary configuration, the first information processing apparatus may further include stereoscopically viewable image taking means for taking images of the photographed subject from a plurality of points of view, and the storage means may store, as the data in the first format, stereoscopically viewable image data representing stereoscopically viewable images of the photographed subject obtained by the stereoscopically viewable image taking means taking the images of the photographed subject.

In the exemplary configuration described above, stereoscopically viewable image data generated by another information processing apparatus can be obtained with enhanced ease, thereby promoting distribution and circulation of the stereoscopically viewable image data.

In still another exemplary configuration, the at least one code image may be a coded image formed by a one-dimensional code or a multi-dimensional code, and the code image display means of the third information processing apparatus may display, by using the first display device, the at least one code image of the one-dimensional code or the multi-dimensional code, based on the code image data.

In the exemplary configuration described above, the combination file can be generated as, for example, a still image file or a moving image file of code images in a format which is already widespread and used, thereby enhancing ease with which the data in the first format can be obtained, and promoting the distribution thereof.

In still another exemplary configuration, the code image generation means may generate a plurality of the code images, and the code image display means of the third information processing apparatus may sequentially display the plurality of the code images by using the first display device in a predetermined order, based on the code image data.

In the exemplary configuration described above, for example, a moving image file for displaying an animation of a plurality of the code images can be generated as the combination file. Thus, even when the size of the data in the first format is greater than the size corresponding to the code image data for one image, the data in the first format can be transformed into a plurality of the code images, and the data in the first format can be obtained with enhanced ease regardless of the size of data.

In another exemplary configuration, the information processing system may include a server capable of communicating with the first information processing apparatus, the second information processing apparatus, and the third information processing apparatus. The first information processing apparatus may include transmitting means for transmitting, to the server, the data in the first format, and the code image data in the second format. Further, the server may include data storage means for storing the data in the first format and the code image data in the second format which are transmitted by the transmitting means. Furthermore, the second information processing apparatus may further include first receiving means for receiving, from the server, the data in the first format which is stored in the data storage means. The information processing means may perform the predetermined information processing based on the data in the first format which is received by the first receiving means. Further, the third information processing apparatus may further include second receiving means for receiving, from the server, the code image data in the second format which is stored in the data storage means. The code image display means may display the at least one code image by using the first display device, based on the code image data in the second format which is received by the second receiving means.

In the configuration described above, the data in the first format and the code image data in the second format can be distributed via the server, thereby enhancing the ease with which the data in the first format can be obtained.

An information processing method according to the present invention is an information processing method used by an information processing system including a first information processing apparatus, a second information processing apparatus, and a third information processing apparatus. The information processing method of the first information processing apparatus includes storing step and code image generating step. The storing step stores data in a first format which can be processed by the first information processing apparatus and the second information processing apparatus. The code image generating step transforms the data in the first format into at least one code image by using a predetermined encoding mode, and generates code image data in a second format which can be processed by a general-purpose device including the third information processing apparatus. Further, the information processing method of the second information processing apparatus includes information processing step of performing predetermined information processing based on the data in the first format. Furthermore, the information processing method of the third information processing apparatus includes code image display step of displaying the at least one code image by a first display device, based on the code image data in the second format.

A computer-readable storage medium having stored therein an information processing program according to the present invention is a computer-readable storage medium having stored therein an information processing program executed by computers of a first information processing apparatus, a second information processing apparatus, and a third information processing apparatus, respectively, which are included in an information processing system. The information processing program causes the computer of the first information processing apparatus to function as: storage means and code image generation means. The storage means stores data in a first format which can be processed by the first information processing apparatus and the second information processing apparatus. The code image generation means transforms the data in the first format into at least one code image by using a predetermined encoding mode, and generates code image data in a second format which can be processed by a general-purpose device including the third information processing apparatus. Further, the information processing program causes the computer of the second information processing apparatus to function as information processing means for performing predetermined information processing based on the data in the first format. Furthermore, the information processing program causes the computer of the third information processing apparatus to function as code image display means for displaying the at least one code image by a first display device, based on the code image data in the second format.

According to the present invention, for example, opportunities can be expanded for allowing a user to obtain the data in the first format such as stereoscopically viewable image data, thereby enabling distribution of such data in the first format. Further, use of the information processing apparatus acting as a viewer for such data in the first format can be promoted.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
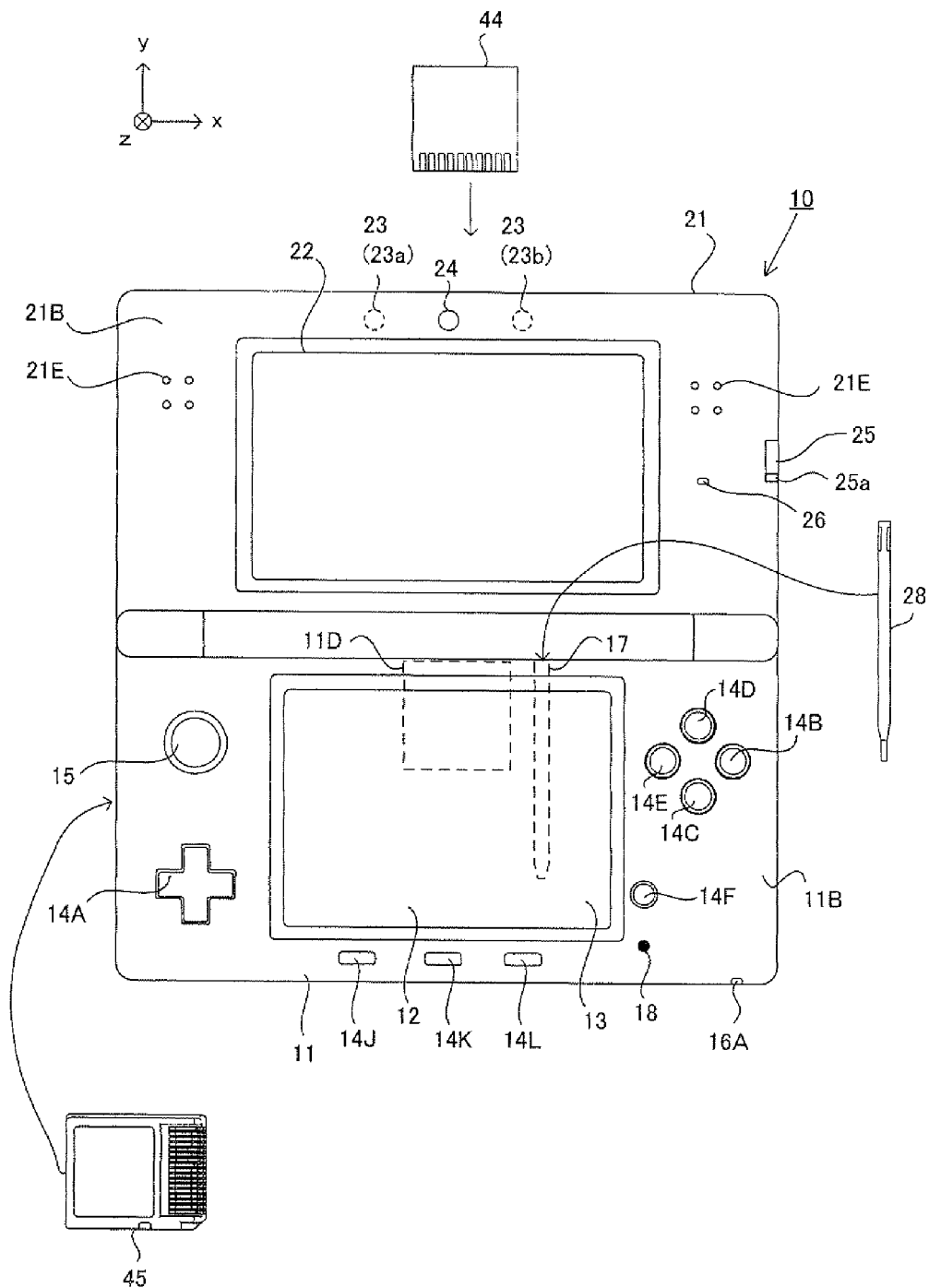
FIG. 1 is a front view of a game apparatus 10 in an opened state.

Hereinafter, an embodiment of the present invention will be described with reference to the drawings. It is to be noted that the present invention is not limited to the embodiment.

Firstly, an object and a concept of technology described as the embodiment will be described.

It is assumed that the technology according to the present embodiment is used in the following cases. Firstly, a case is assumed in which data in a specific format representing certain contents (hereinafter, referred to as data-in-specific-format) is processed, and the contents can be reproduced only by an information processing apparatus (hereinafter, referred to as a supporting device) having a function of reproducing the data-in-specific-format. An exemplary ease can be assumed in which the contents are stereoscopically viewable images, and the supporting device is, for example, an information processing apparatus having a display capable of stereoscopic display, or the like. An object of the technology described in the present embodiment is to enable the supporting device to easily obtain such data-in-specific-format.

In the present embodiment, the following configuration and functions enables achievement of this object. Firstly, the data-in-specific-format is generated by using the supporting device, and the like, and the data-in-specific-format is subjected to a predetermined encoding process, thereby transforming the data-in-specific-format into a coded image (for example, a two-dimensional bar code image). Namely, the data-in-specific-format is transformed into a coded image. The coded image is image data in a format that enables a device (for example, a typical personal computer or a mobile telephone) other than the supporting device to display the coded image on a screen, and the coded image is more preferably in a form of a file, which is widespread in general.

Further, the coded image is combined with the data-in-specific-format itself (binary data) which is the original data before encoded, to obtain one file. The combination file which is obtained by the combination is distributed by, for example, being used in a web page, or being copied into another supporting device or a non-supporting device by means of a predetermined storage medium. When the combination file is displayed by the non-supporting device, the coded image is displayed. The coded image is photographed and decoded by the supporting device (a camera is mounted to the supporting device as described below), thereby reproducing the original data-in-specific-format. On the other hand, when the combination file is directly read for display by the supporting device (for example, when the web page is read and displayed), a portion corresponding to the data-in-specific-format which is contained in the combination file is directly read, and the data-in-specific-format can be reproduced without photographing and decoding the coded image as described above.

Thus, the technology enables both a process of directly obtaining the combination file, and a process of indirectly obtaining the combination file (photographing and decoding the coded image displayed by another device), so as to expand opportunities for obtaining the data-in-specific-format as described above.

Next, a configuration of a game apparatus 10 typifying the supporting device of the present embodiment will be described with reference to FIG. 1. More specifically, the game apparatus 10 is used mainly as "a stereoscopic image viewer" in the present embodiment.

FIG. 1 shows the game apparatus 10 as a hand-held foldable game apparatus, and shows the game apparatus 10 in the opened state. The game apparatus 10 has such a size as to be hold by a user with his/her both hands or one hand, even in the opened state.

The game apparatus 10 includes a lower housing 11 and an upper housing 21. The lower housing 11 and the upper housing 21 are connected to each other so as to be openable and closable (foldable). In an exemplary case shown in FIG. 1, the lower housing 11 and the upper housing 21 are each formed in a horizontally long plate-like rectangular shape, and are connected to each other at long side portions thereof so as to be pivotable with respect to each other. In general, a user uses the game apparatus 10 in the opened state. Further, when the game apparatus 10 is not used, a user can keep the game apparatus 10 in the closed state.

The lower housing 11 has a lower LCD (liquid crystal display) 12 mounted therein. The lower LCD 12 has a horizontally long shape, and is located such that a long side direction thereof corresponds to a long side direction of the lower housing 11. Although an LCD is used as a display device incorporated in the game apparatus 10 in the present embodiment, any other display device such as a display device using an EL (Electro Luminescence), or the like may be used. In addition, a display device having any resolution may be used for the game apparatus 10.

In the lower housing 11, operation buttons 14A to 14L and a touch panel 13 are provided as input devices. The operation buttons 14A to 14L are each an input device for performing a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

An analog stick 15 is a device for indicating a direction, and is provided to the left of the lower LCD 12 in an upper portion of the inner side surface of the lower housing 11. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 are disposed on opposite sides of the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone is provided as a sound input device described below, and the microphone detects for a sound from the outside of the game apparatus 10.

In FIG. 1, illustration of the operation buttons 14G to 14I is omitted. For example, the L button 14G is positioned on the left end portion of the upper side surface of the lower housing 11 and the R button 14H is positioned on the right end portion of the upper side surface of the lower housing 11. The L button 14G and the R button 14H are used for an operation (shutter operation) for instructing the game apparatus 10 to perform imaging, for example. Further, a sound volume button 14I is provided on the left side surface of the lower housing 11. The sound volume button 14I is used for adjusting a sound volume of a speaker of the game apparatus 10.

Further, the game apparatus 10 includes the touch panel 13 as an input device other than the operation buttons 14A to 14K. The touch panel 13 is mounted on the screen of the lower LCD 12. In the present embodiment, the touch panel 13 may be, but is not limited to, a resistive film type touch panel. Any press-type touch panel can be used. In the present embodiment, the touch panel 13 has, for example, the same resolution (detection accuracy) as that of the lower LCD 12. However, the resolution of the touch panel 13 and the resolution of the lower LCD 12 may not necessarily be the same. Further, an insertion opening 17 (indicated by dashed line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

Further, a cover section 11C (not shown) is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C thereof may be provided on the right side surface of the lower housing 11.

Further, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D thereof may be provided on another side surface (for example, the right side surface) of the lower housing 11.

Further, a first LED 16A for notifying a user of an ON/OFF state of a power supply of the game apparatus 10 is provided on the lower side surface of the lower housing 11, and a second LED 16B (not shown) for notifying a user of an establishment state of a wireless communication of the game apparatus 10 is provided on the right side surface of the lower housing 11. The game apparatus 10 can make wireless communication with other devices, and the second LED16B is lit up when the wireless communication is established. The game apparatus 10 has a function of connecting to a wireless LAN in a method compliant with, for example, IEEE 802.11b/g standard. A wireless switch 19 (not shown) for enabling/disabling the function of the wireless communication is provided on the right side surface of the lower housing 11.

Further, in the upper housing 21, the upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Further, the touch panel may be provided so as to cover the upper LCD 22.

The screen of the upper LCD 22 is provided on the inner side surface (main surface) 21B of the upper housing 21, and the screen of the upper LCD 22 is exposed at an opening of the upper housing 21. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically viewable image. In the present embodiment, the upper LCD 22 is a display device capable of displaying an image which is stereoscopically viewable with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. Further, the parallax barrier can be disabled in the upper LCD 22. When the parallax barrier is disabled, an image can be displayed in a planar manner. Thus, the upper LCD 22 is a display device capable of switching between a stereoscopic display mode for displaying a stereoscopically viewable image and a planar display mode (for displaying a planar viewable image) for displaying an image in a planar manner. The switching of the display mode is performed by the 3D adjustment switch 25 acting as a slide switch.

Two imaging sections (23a and 23b) provided on the outer side surface (the back surface reverse of the main surface on which the upper LCD 22 is provided) of the upper housing 21 are generically referred to as the outer imaging section 23. The imaging directions of the outer imaging section (left) 23a and the outer imaging section (right) 23b are each the same as the outward normal direction of the outer side surface. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having the same predetermined resolution, and a lens. The lens may have a zooming mechanism.

As indicated by dashed lines in FIG. 1, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled.

Further, a speaker hole 21E is provided on the inner side surface of the upper housing 21. A sound is outputted through the speaker hole 21E from a speaker 43 described below.

(Internal Configuration of Game Apparatus 10)

Figure 2:
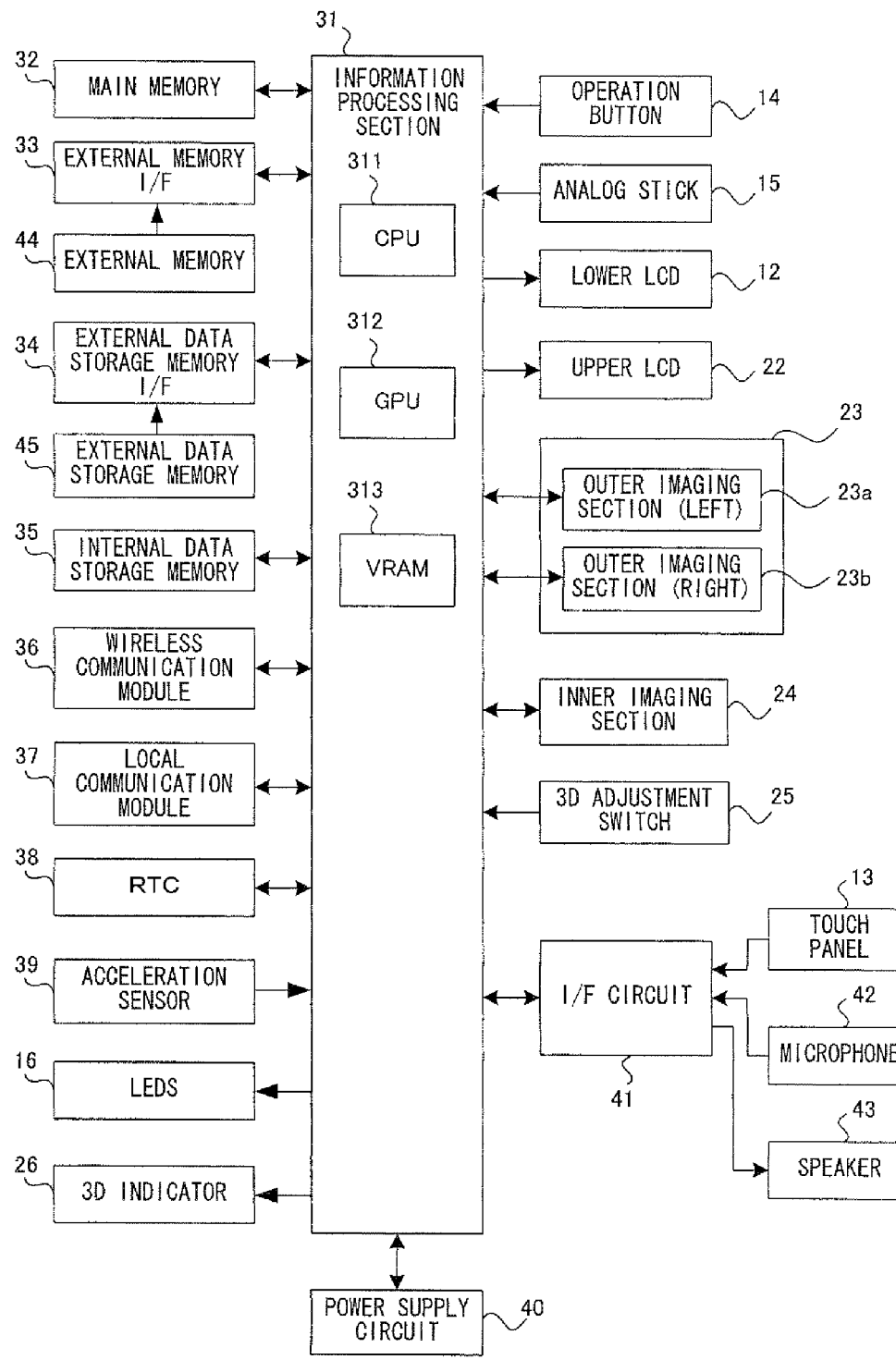
FIG. 2 is a block diagram illustrating an internal configuration of the game apparatus 10.

Next, an internal electrical configuration of the game apparatus 10 will be described with reference to FIG. 2. FIG. 2 is a block diagram illustrating an internal configuration of the game apparatus 10. As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) in the game apparatus 10, to execute a process according to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external data storage memory 45 is implemented as a non-volatile readable and writable memory (for example, a NAND flash memory), and is used for storing predetermined data.

The internal data storage memory 35 is implemented as a non-volatile readable and writable memory (for example, a NAND flash memory), and is used for storing predetermined data.

The wireless communication module 36 has a function of connecting to a wireless LAN by using a method compliant with, for example, IEEE 802.11b/g standard. The local communication module 37 has a function of performing wireless communication with the same type of game apparatus in a predetermined communication method (for example, communication based on a unique protocol or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz-axial) directions, respectively. The acceleration sensor 39 is provided inside the lower housing 11.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through a not-illustrated amplifier. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically viewable image).

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Next, an outline of a process executed in the present embodiment will be described. In the present embodiment, an exemplary case will be described in which the data-in-specific-format is, for example, a stereoscopically viewable image (hereinafter, referred to as a stereophotograph) obtained by using the outer imaging section 23 as a stereo camera, the coded image is, for example, a two-dimensional bar code, more specifically, a two-dimensional code, and the combination file is, for example, a so-called GIF animation file.

Figure 3:
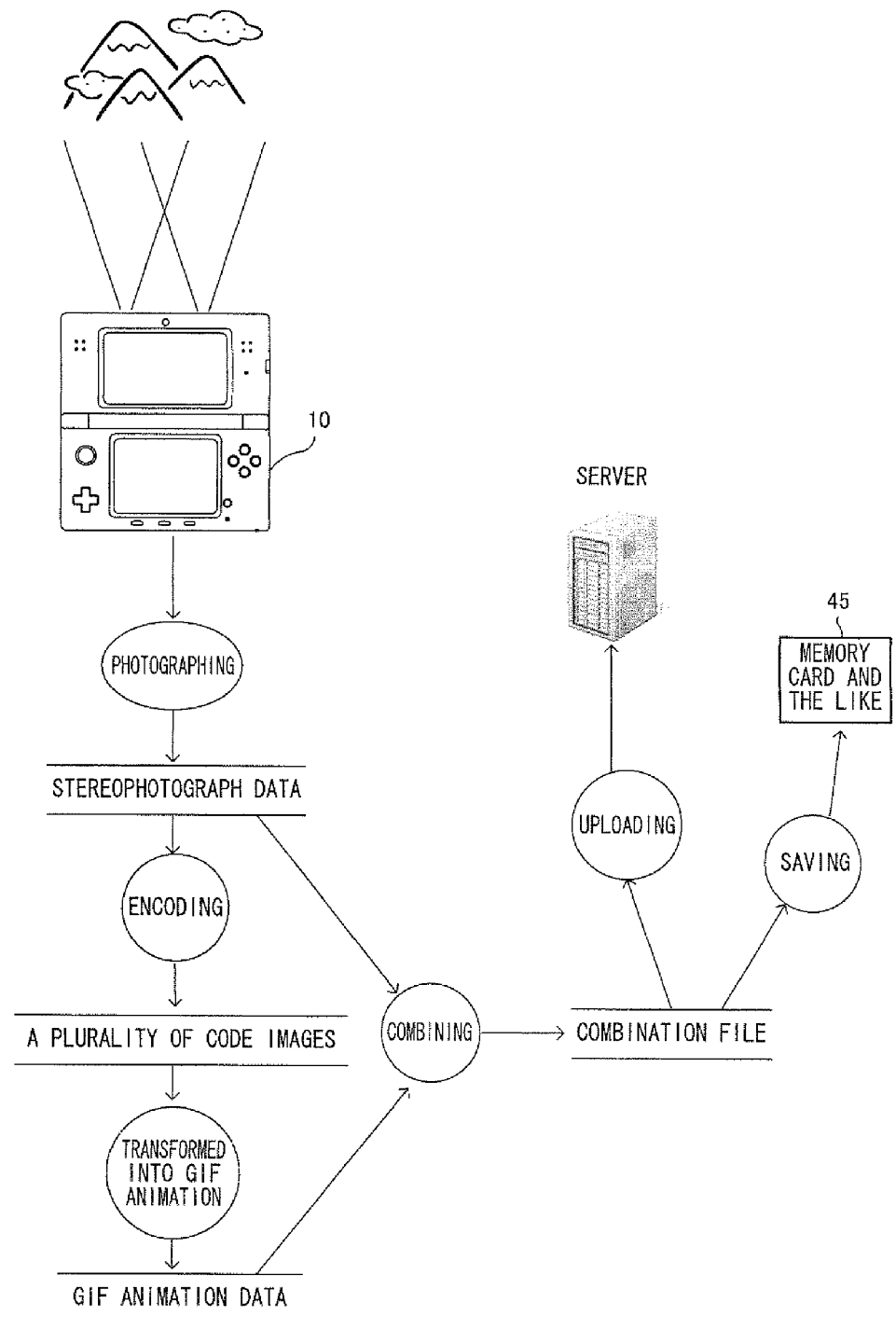
FIG. 3 is a diagram illustrating an outline of a process executed in an embodiment of the present invention.
Figure 4:
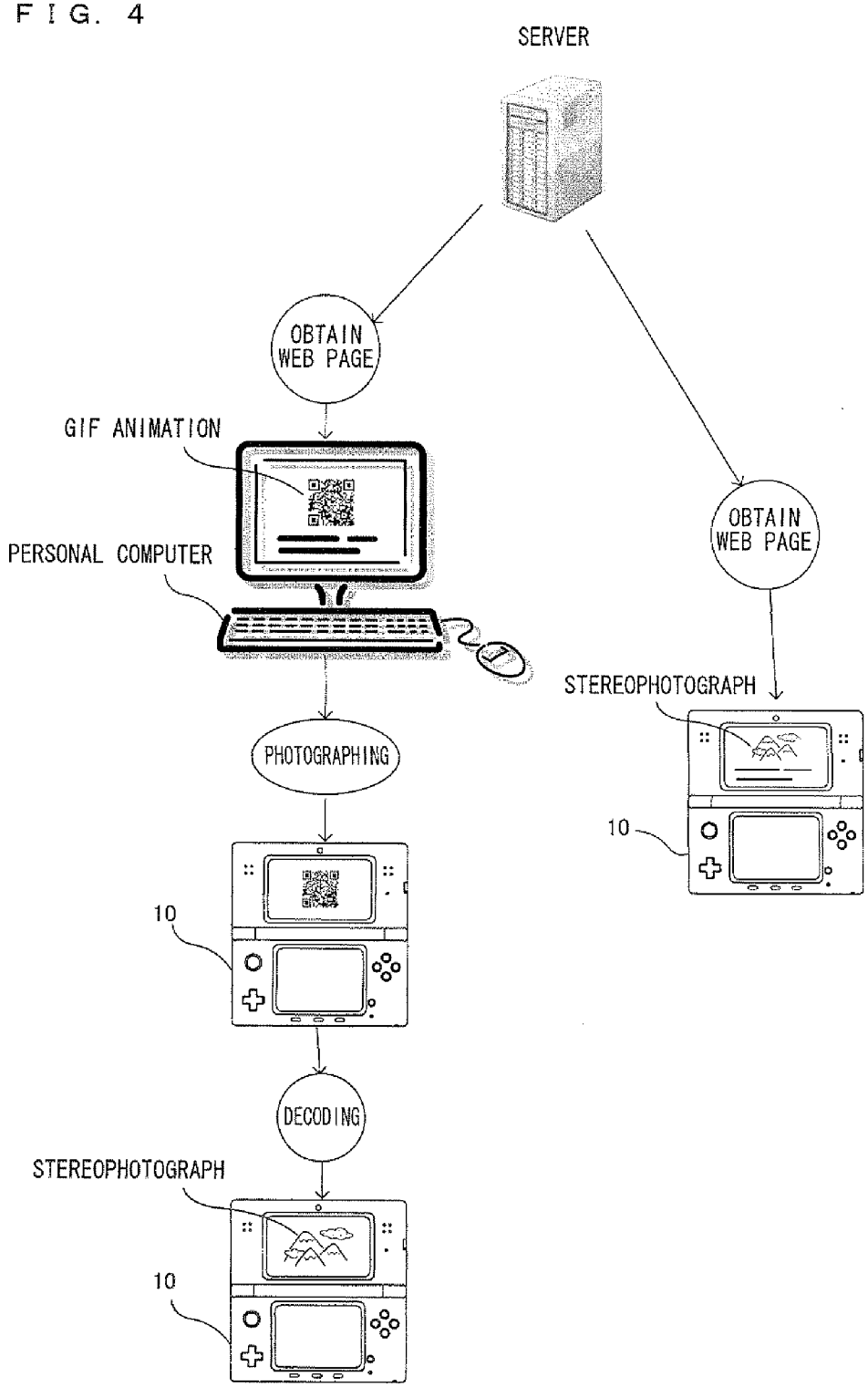
FIG. 4 is a diagram illustrating an outline of the process executed in the embodiment.

FIG. 3 and FIG. 4 are diagrams illustrating outlines of the process executed in the present embodiment. The process according to the present embodiment includes two main processes. One of the main processes is a process associated with generation of the combination file described above (FIG. 3). The other of the main processes is a process associated with obtaining and reproduction of the combination file (FIG. 4).

Firstly, an outline of the process associated with the generation of the combination file will be described with reference to FIG. 3. Firstly, a photographing process is performed by the stereo camera of the game apparatus 10, to generate stereophotograph data (which is, for example, data in a format called an MPO file).

Next, the stereophotograph data is subjected to a predetermined encoding process, to generate a plurality of pieces of two-dimensional code data. It is to be noted that a plurality of pieces of data is generated because information amount for one stereoscopically viewable image is greater than information amount for one piece of two-dimensional code data in general, and the one stereoscopically viewable image is separated to generate a plurality of pieces of two-dimensional code data. Therefore, if, for example, a format is used which enables a sufficient information amount of data to be represented in one code image which may be any form of data including the two-dimensional code data, the number of the code images to be generated may be one (that is, a still image).

Further, GIF animation data is generated based on the plurality of two-dimensional code images. Namely, the GIF animation data (moving image data) is generated so as to display an animation in which the plurality of two-dimensional code images are sequentially displayed.

Next, a process of combining the GIF animation data with the stereophotograph data is executed. In the present embodiment, binary data of the stereophotograph data is added, as it is, so as to immediately follow the end of the GIF animation data (end of binary data), thereby generating the combination file. Further, the combination file is generated such that a file format of the generated combination file represents a GIF animation file (extension is "gif").

The combination file having been thus generated is stored in a memory card or the like. As a result, the combination file can be distributed to another game apparatus 10 and the like by means of the memory card. Further, the combination file is generated as a file in the GIF animation format, and therefore the combination file can be used as an element of a user's blog, web page, and the like. In this case, data of the web page including the combination file is uploaded onto a server as necessary. As a result, the combination file can be widely distributed and circulated as a (part of) web page.

Next, an outline of the process associated with obtaining and reproduction of the combination file having been generated as described above will be described with reference to FIG. 4. In the present embodiment, an exemplary case will be described in which a user accesses, via the Internet, a web page including the combination file. Further, as an accessing method, two methods will be described. One of the methods is a method in which the access is performed by using a non-supporting device (for example, personal computers which do not support stereoscopically viewable display, mobile telephones, and smartphones), and the other of the methods is a method in which the access is performed by using a supporting device (game apparatus 10).

Firstly, an exemplary case will be described in which a user accesses the web page by using a personal computer which is an exemplary non-supporting device. This exemplary case is, for example, a case in which the Internet cannot be accessed since the game apparatus 10 is not set so as to be connected to a network, or a case in which the supporting device originally designed so as to have no function for accessing the Internet is used. In these cases, firstly, a user accesses the web page by using the personal computer. As a result, the web page is displayed on the screen of the personal computer, and the GIF animation of the two-dimensional code images as described above is displayed in a portion in which the combination file is displayed on the web page.

Next, the user photographs the GIF animation displayed on the screen of the personal computer by using the outer imaging section 23 of the game apparatus 10 (namely, obtains the plurality of the two-dimensional code images). Thus, the images of the GIF animation are obtained by the game apparatus 10. In the present embodiment, a data-in-specific-format generation application (described below in detail) is used for photographing the GIF animation and for the process described below.

When the GIF animation (the plurality of two-dimensional code images) has been obtained, the plurality of two-dimensional code images are decoded by the game apparatus 10 (the data-in-specific-format generation application). As a result, the stereophotograph is reproduced, and is stereoscopically displayed on the upper LCD 22 of the game apparatus 10. Namely, the stereophotograph data can be obtained and displayed by the game apparatus 10 by the game apparatus 10 photographing the animation of the two-dimensional code images displayed by the non-supporting device.

Next, a case will be described in which the game apparatus 10 which is the supporting device directly accesses the web page. This case is, for example, a case in which the game apparatus 10 is connectable to the Internet. Further, in the present embodiment, the web page is accessed by using a specific-format-compliant browser which is preinstalled in the game apparatus 10.

Firstly, a user performs an operation for starting up the specific-format-compliant browser, to access the web page as described above. In response thereto, data (HTML data and the like) of the web page is obtained from the server, and temporality stored in a memory. Next, HTML rendering process is performed for displaying the web page on the screen. At this time, whether data forming the web page includes the combination file as described above is determined. When the combination file is included, the stereophotograph data is extracted from the combination file. Namely, data of the GIF animation is not used. The web page is displayed by using the stereophotograph data having been extracted. As a result, a stereophotograph is directly displayed on a portion at which the GIF animation is displayed when access is performed by the personal computer.

Thus, the process of directly obtaining the stereophotograph data (for example, directly accessing the web page by using the specific-format compliant browser), and the process of indirectly obtaining the stereophotograph data (photographing and decoding the two-dimensional code image displayed by another device) are enabled, thereby establishing an environment in which the data-in-specific-format such as the stereophotograph can be obtained with enhanced ease.

Figure 5:
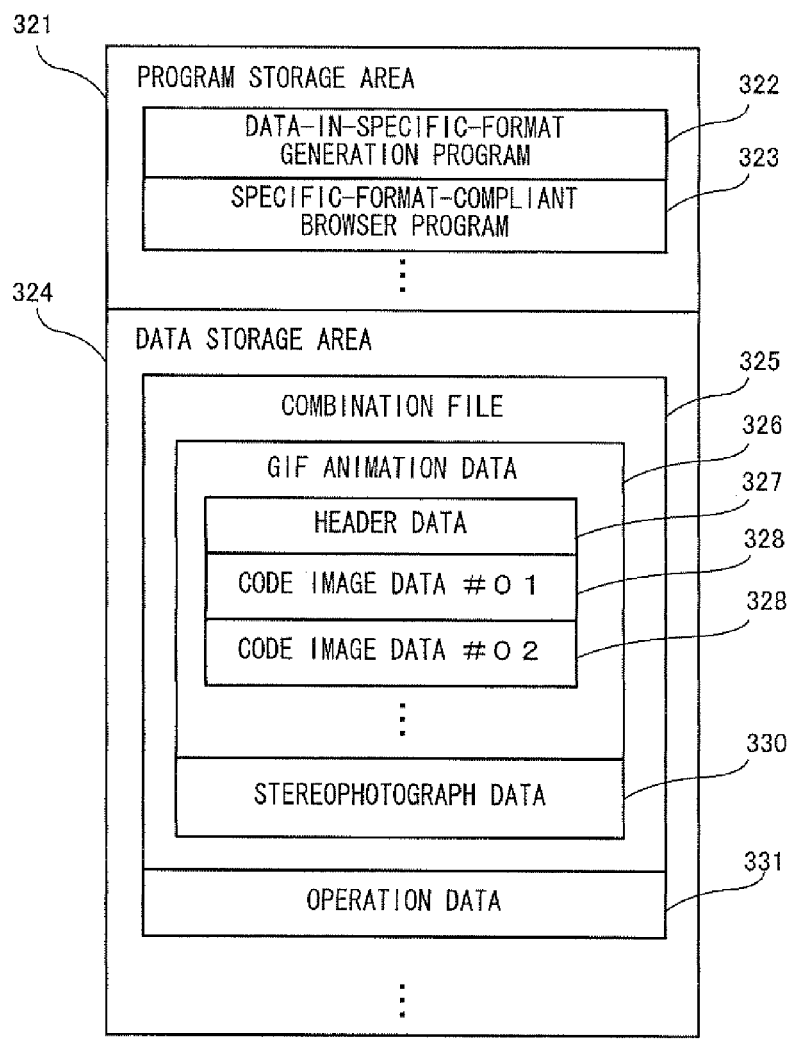
FIG. 5 is a diagram illustrating a memory map of a main memory 32.

Next, the above-described process executed by the game apparatus 10 will be described in detail. Firstly, various data stored in the main memory 32 for the process will be described. FIG. 5 is a diagram illustrating a memory map of the main memory 32 of the game apparatus 10. In FIG. 5, the main memory 32 includes a program storage area 321 and a data storage area 324. Data in the program storage area 321 and the data storage area 324 is stored in, for example, the internal data storage memory 35, and is transferred to and stored in the main memory 32 when the program is executed.

In the program storage area 321, various programs executed by the information processing section 31 are stored. The programs include a data-in-specific- format generation program 322 and a specific-format-compliant browser program 323. Further, in addition to the above-described programs, a home menu program for displaying a home menu of the game apparatus 10, a camera application program for photographing stereophotographs by using the outer imaging section 23, and the like are stored, which are not shown.

The data-in-specific-format generation program 322 is a program of an application for generating the combination file as described above. Further, the data-in-specific-format generation program 322 is also a program for providing the game apparatus 10 with a function of obtaining the two-dimensional code images displayed by the non-supporting device, and reproducing and displaying the stereophotograph, as described with reference to FIG. 4. The specific-format-compliant browser program 323 is a web browser program for viewing the Internet, and the like (for interpreting the HTML and performing rendering and display), and is a browser which enables display of the stereophotograph as described above. Namely, the specific-format-compliant browser program 323 is a stereoscopically-viewable-image compliant web browser, and, in the present embodiment, is a web browser having a function of extracting the stereophotograph data from the combination file by performing a process described below, and of displaying the stereophotograph based on the data.

In the data storage area 324, data such as a combination file 325 and operation data 331 is stored.

The combination file 325 is a file (extension is "gif") having a GIF animation format, and containing both GIF animation data 326 including a plurality of two-dimensional code images as described above, and stereophotograph data 330. The GIF animation data 326 is binary data including header data 327, a plurality of pieces of code image data 328, and the like. The header data 327 contains header information such as image sizes and color palette of the GIF animation (corresponding to a so-called (HF header in the GIF format). The code image data 328 represents a two-dimensional code image (corresponding to a so-called graphic control extension and image block in the GIF format) obtained by encoding the stereophotograph data 330, in the present embodiment.

The stereophotograph data 330 is binary data of a stereophotograph photographed by using the outer imaging section 23 of the game apparatus 10 as a stereo camera.

The operation data 331 is data representing contents of operation performed by a user on the game apparatus 10.

In addition thereto, for example, data of the web page accessed by using the specific-format-compliant browser described above is stored in the main memory 32 as necessary.

Next, a process executed by the game apparatus 10 will be described. The process described below is performed under the condition that the stereophotograph file (in the present embodiment, data in a so-called MPO format) has been previously generated by the camera application being executed by the game apparatus 10, and has been stored in the external data storage memory 45.

Figure 6:
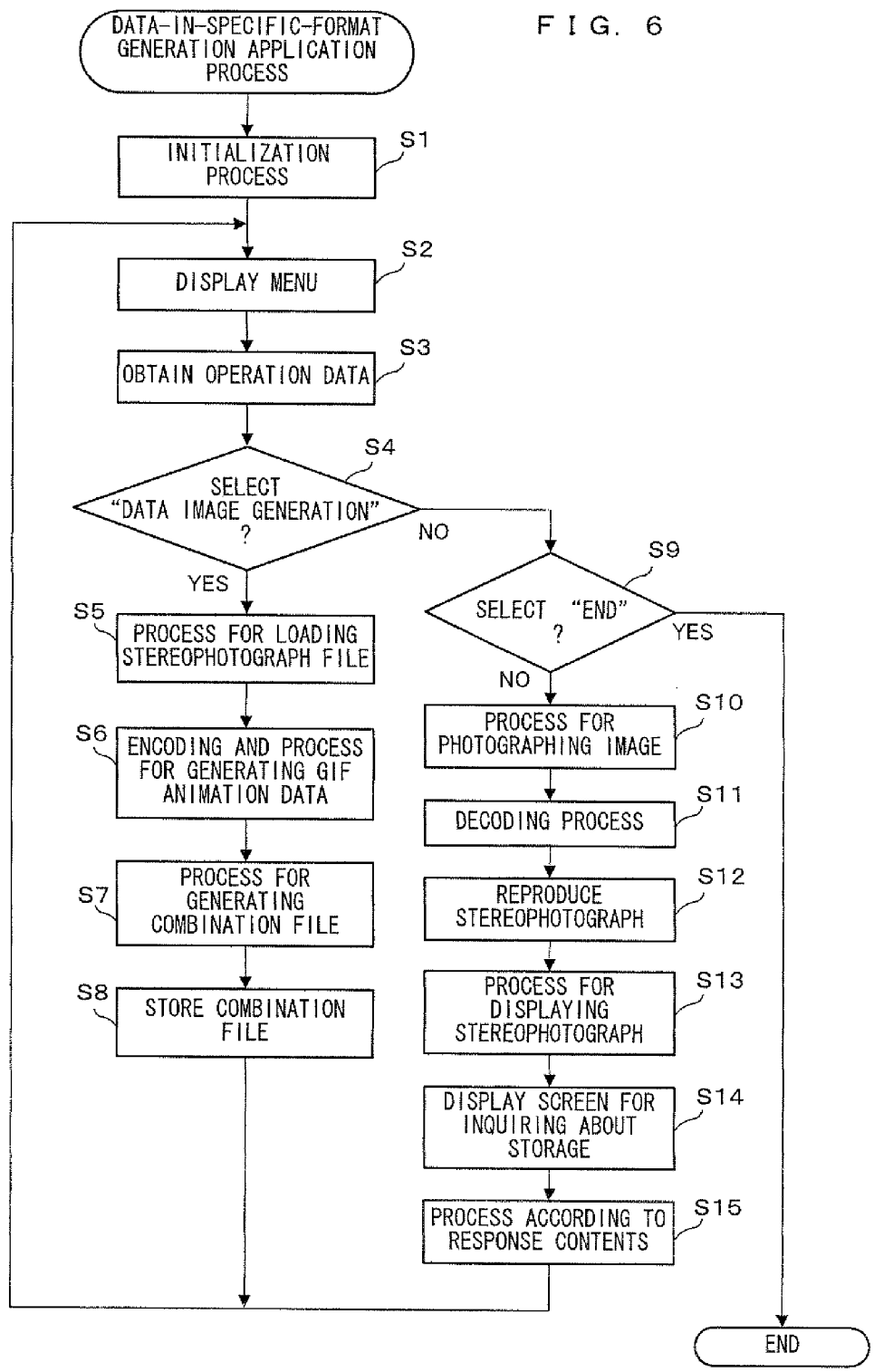
FIG. 6 is a flow chart showing in detail a process of a data-in-specific-format generation application.

Firstly, a process according to the data-in-specific-format generation application will be described in detail. The application is used for generating the combination file 325, and photographing the two-dimensional code images displayed by the non-supporting device, to reproduce a stereoscopic image. FIG. 6 is a flow chart showing in detail the process according to the data-in-specific-format generation application. In this process, a user performs, on a home menu (illustration is omitted), an operation for starting up the application, thereby starting the execution of the process.

When execution of the process according to the application is started, an initialization process is firstly executed in step S1. In the initializing process, for example, various data used in the application is initialized, and an initial menu screen for the application is generated. Further, the outer imaging section 23 is actuated, and a process of displaying, on the upper LCD 22, an image photographed by the outer imaging section 23 is started.

Figure 7:
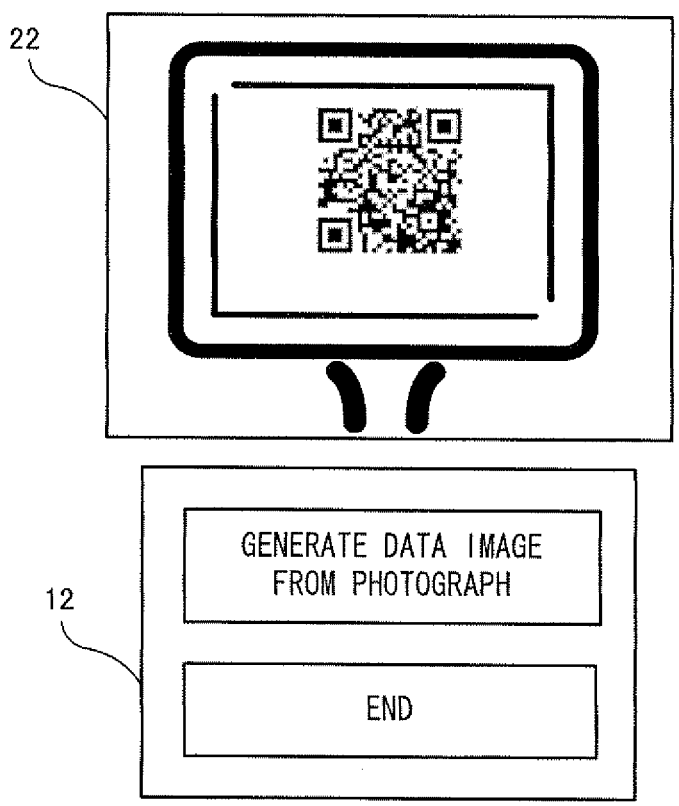
FIG. 7 shows an exemplary menu screen of the data-in-specific-format generation application.

Next, in step S2, a process of displaying, on the lower LCD 12, a menu screen for the application is executed. In the present embodiment, two indications, that is, "data image generation" and "end" are displayed on the menu screen. As a result of the process, a screen shown in FIG. 7 is displayed.

Next, in step S3, the operation data 331 is obtained. In subsequent step S4, whether the "data image generation" is selected from the menu is determined based on the operation data 331. When the result of the determination indicates that the "data image generation" is selected (YES in step S4), a process of loading the stereophotograph file is then executed in step S5. More specifically, the external data storage memory 45 is firstly referred to, and a list of the stereophotograph files which are individually stored is displayed on the lower LCD 12. When, according thereto, a user selects a desired stereophotograph, a file of the stereophotograph having been selected is loaded from the external data storage memory 45 into the main memory 32.

When the loading of the stereophotograph file has been ended, a process of encoding the stereophotograph file having been loaded, to generate the two-dimensional code images, and a process of generating the GIF animation data 326 using the two-dimensional code images are executed in step S6.

Next, in step S7, a process of generating the combination file 325 based on the GIF animation data 326 having been generated and the stereophotograph file having been loaded is executed. Specifically, a process of adding the binary data of the stereophotograph file is executed such that the stereophotograph file immediately follows the end of the GIF animation data 326.

In step S8, a process of storing the combination file 325 in the external data storage memory 45 is executed. At this time, in the present embodiment, a file name is determined according to a predetermined naming rule. The predetermined naming rule is a naming rule for identifying the combination file 325. For example, a predefined character string is used for several initial characters of the file name, and the extension is set as "gif". When the storage of the combination file 325 has been completed, the process is returned to step S2, and the process is repeated.

Next, a process performed when the result of the determination in step S4 indicates that the "data image generation" is not selected from the menu (NO in step S4) will be described. At this time, in step S9, whether "end" is selected from the menu is determined. When the result of the determination indicates that the "end" is selected (YES in step S9), the process according to the application is ended. On the other hand, when it is determined that the "end" is not selected, a process of for example, obtaining the two-dimensional code images by using the outer imaging section 23 is executed. Specifically, in step S10, the photographing process performed by the outer imaging section 23 is executed. In this process, a guidance message for photographing the two-dimensional code images, a message indicating completion of photographing, and the like are displayed as necessary, which are not shown. Further, as to photographing of the GIF animation (for determining that the photographing has been ended), for example, a process of sequentially obtaining the two-dimensional code images which are sequentially displayed as the GIF animation may be performed until the same two-dimensional code image as the two-dimensional code image obtained when the obtaining is started is photographed.

Next, in step S11, a process of decoding the plurality of two-dimensional code images photographed in step S10 is executed. In the subsequent step S12, a process of combining the two-dimensional code data having been decoded, with each other, to reproduce the original stereophotograph data is executed. In step S13, a process of displaying the reproduced stereophotograph on the upper LCD 22 is executed.

In subsequent step S14, a process associated with storage of data of the stereophotograph displayed on the upper LCD is executed. Specifically, a screen for inquiring whether the stereophotograph which is currently displayed is to be stored is firstly displayed on the lower LCD 12. When a user selects storage of the stereophotograph, in response to the inquiry, a process is executed for storing data of the stereophotograph which is currently displayed, as a file in the MPO format, in the external data storage memory 45. The process is returned to step S2, and the process steps are repeated. On the other hand, when a user does not select the storage, the process is returned to step S2 without executing the process for the storage. This is the end of the description for the data-in-specific-format generation application.

Figure 8:
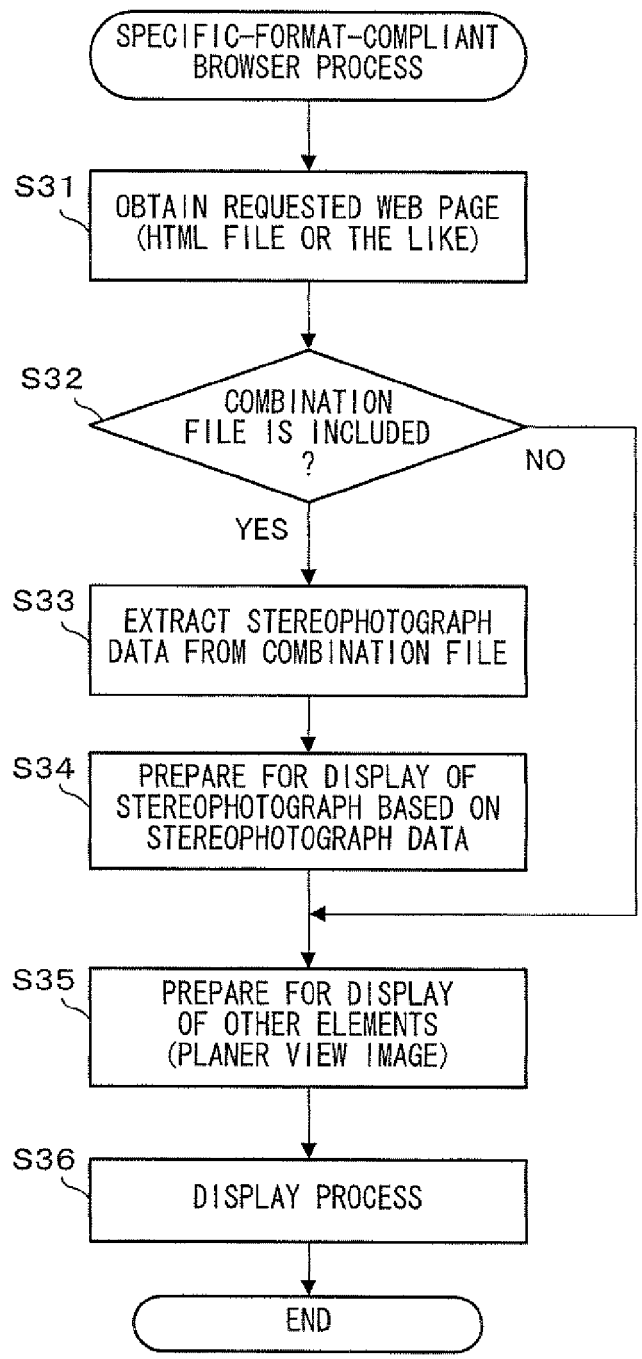
FIG. 8 is a flow chart showing in detail a specific-format-compliant browser process.

Next, the specific-format-compliant browser process will be described in detail with reference to FIG. 8. The execution of this process is also started when a user performs, on the home menu (illustration is omitted), an operation for starting up the specific-format-compliant browser.

Firstly, in step S31, a process is executed for accessing a predetermined server to obtain a web page requested by a user, based on a request operation (for example, for inputting a URL, or selecting linking to the web page) from the user. As a result of the process, various data which forms the web page is temporarily stored in the main memory 32.

Next, in step S32, whether the combination file 325 is included in the data elements of the web page is determined with reference to the data of the web page stored in the main memory 32. For example, whether the combination file 325 is included is determined by, for example, detecting for a GIF file compliant with the naming rule as described above (the several initial characters of the file name is a predefined character string, and the extension is "gif"). When the result of the determination indicates that the combination file 325 is not included (NO in step S32), the process is advanced to step S35 described below. On the other hand, when it is determined that the combination file 325 is included (YES in step S32), a process is executed for extracting the stereophotograph data 330 from the combination file 325, and storing the stereophotograph data 330 in the main memory 32, in step S33. In the subsequent step S34, a process is executed for generating an image of the stereophotograph based on the stereophotograph data 330 having been extracted. A process is executed for preparing for display of the stereophotograph in a display portion corresponding to the combination file 325 in the web page (rendering into the VRAM 313).

Next, in step S35, a process is executed for preparing for display of data elements for the web page other than the combination file 325 (rendering into the VRAM 313).

In step S36, an image of the web page rendered in the VRAM 313 is outputted to the upper LCD 22, thereby executing a process of displaying the web page. As a result, when the web page does not include the combination file 325, an image as displayed by a standard web browser is displayed. When the web page includes the combination file 325, the web page in which the stereoscopic view image and the planer view image are mixedly included is displayed such that the stereophotograph is displayed in a portion which corresponds to the combination file in the web page, and the planer view image is displayed in the other portions. This is the end of the description for the specific-format-compliant browser process.

Thus, in the present embodiment, the stereophotograph data is transformed into a plurality of two-dimensional code images, and the GIF animation data including the plurality of two-dimensional code images is generated. Further, the original stereophotograph data which is the stereophotograph data before transformed is added, as it is, to the GIF animation data, to generate one combination file, and the combination file is distributed and circulated. Further, software, such as the specific-format-compliant browser, having a function of processing the combination file is provided. Thus, it is possible to provide various processes for obtaining stereoscopic image data, thereby expanding opportunities for obtaining the stereoscopic image data. As a result, the stereoscopic image data can be obtained with enhanced ease. For example, the GIF animation displayed on the screens of personal computers and mobile telephones is photographed by the game apparatus 10 having photographing function, thereby enabling the stereophotograph data to be obtained. Further, the game apparatus 10 can access the web page including the combination file (by using the specific-format-compliant browser), thereby obtaining the stereophotograph data. Moreover, a memory card having the combination file stored therein is loaded into the game apparatus 10, thereby enabling the stereophotograph data to be obtained.

In the embodiment described above, the stereophotograph is described as exemplary data-in-specific-format. However, the present invention is not limited thereto. The data-in-specific-format may be, for example, other image data. Further, the present invention is applicable to general digital data such as document data, sound data, and moving image data. Further, the present invention is also applicable to a predetermined program (for example, a program for a mini game specific to the game apparatus 10) itself (binary data). Such digital data is transformed into a code image, and the combination file is generated in which the original data which is data before transformed is added as it is (so as to immediately follow the end of the binary data), thereby enabling the same effect as described for the embodiment described above to be obtained.

Furthermore, although in the embodiment described above the GIF animation file is generated so as to include a plurality of two-dimensional code images, a moving image file in another format may be used. For example, a moving image representing sequentially displayed two-dimensional code images may be used as an MPEG moving image file.

Further, the code image is not limited to that in the two-dimensional code format. Needless to say, a one-dimensional code image, a code image (for example, high capacity color barcode) using three or more colors, and a three-dimensional or higher-dimensional code image may be used, Further, in the embodiment described above, in the process of detecting for the combination file included in the web page, a file name of the combination file determined according to a predetermined naming rule is detected. In addition to use of the method using such file name, in the process of detecting for the combination file, information by which the combination file can be identified may be contained (for example, as one of header information) in the combination file, and the specific-format-compliant browser may have a function of determining whether such information is contained.

Furthermore, although in the embodiment described above data of the stereophotograph is transformed into the code images, data thereof may be transformed so as to have a sound format as well as the image format. In this case, the sound data obtained by encoding the stereophotograph may be reproduced by, for example, personal computers and mobile telephones, and the game apparatus 10 may record the sound by means of a microphone or the like, and decode the sound.

Moreover, although, in the embodiment described above, a hand-held game apparatus including two display devices is described, for example, a hand-held terminal having a single display device capable of displaying a stereoscopically viewable image may be used.

While the invention has been described in detail, the foregoing description is in all aspects illustrative and not restrictive. It is to be understood that numerous other modifications and variations can be devised without departing from the scope of the invention.

What is claimed is:

1. An information processing system comprising a first information processing apparatus, a second information processing apparatus, and a third information processing apparatus, the information processing system comprising:
    the first information processing apparatus including:
        a storage device storing stereoscopic data in a first format which can be processed by the first information processing apparatus and the second information processing apparatus; and
        a code image generator configured to transform at least a part of the stereoscopic data in the first format into at least one displayable code image by using a predetermined encoding mode, and generating code image data in a second format which can be processed by a general-purpose device including the third information processing apparatus,
    the second information processing apparatus including an information processor that performs stereoscopic information processing based on the stereoscopic data in the first format without requiring decoding of the code image, and
    the third information processing apparatus including a first display device that displays the at least one displayable code image, based on the code image data in the second format.

2. The information processing system according to claim 1, wherein
    the second information processing apparatus further includes:
        an imager that takes an image of a photographed subject which is to be photographed; and
        a decoder that decodes, when the photographed subject the image of which has been taken by the imager contains the at least one displayable code image, and obtains the data in the first format, and
    the information processor performs the stereoscopic information processing based on the data in the first format which has been obtained by the decoder.

3. The information processing system according to claim 2, wherein
    the second information processing apparatus includes a selector capable of selecting one of a first mode and a second mode according to an operation performed by a user, and
    the information processor performs the stereoscopic information processing based on the data in the first format when the selector selects the first mode, and performs, when the selector selects the second mode, the stereoscopic information processing based on the data in the first format which has been obtained by decoding, by the decoder, the at least one displayable code image contained in the image taken by the imager.

4. The information processing system according to claim 1, wherein
    the first information processing apparatus includes general-purpose file generator that generates a general-purpose file in a format which can be processed by a device including the third information processing apparatus, the general-purpose file containing the data in the first format and the code image data in the second format,
    the information processor of the second information processing apparatus performs the stereoscopic information processing, based on the data in the first format which is contained in the general-purpose file generated by the general-purpose file generator, and
    the first display device of the third information processing apparatus displays the at least one displayable code image, based on the code image data in the second format which is contained in the general-purpose file generated by the general-purpose file generator.

5. The information processing system according to claim 4, wherein
the general-purpose file generator of the first information processing apparatus generates the general-purpose file containing the data in the first format, the code image data in the second format, and associated data indicating that contents represented by the data in the first format are contained,
the second information processing apparatus further includes:
a general-purpose file obtainer that obtains the general-purpose file; and
a determiner that determines whether the general-purpose file obtained by the general-purpose file obtainer contains the associated data, and
the information processor performs, when the determiner determines that the general-purpose file contains the associated data, the stereoscopic information processing based on the data in the first format which is contained in the general purpose file having been obtained, without using the code image data in the second format which is contained in the general-purpose file having been obtained.

6. The information processing system according to claim 1, wherein
the data in the first format is stereoscopically viewable image data representing a stereoscopically viewable image of the photographed subject, and
the information processor of the second information processing apparatus displays the stereoscopically viewable image by using a second display device based on the data in the first format.

7. The information processing system according to claim 6, wherein
the first information processing apparatus further includes a stereoscopically viewable image taker for taking images of the photographed subject from a plurality of points of view, and
the storage device stores, as the data in the first format, stereoscopically viewable image data representing stereoscopically viewable images of the photographed subject obtained by the stereoscopically viewable image taker taking the images of the photographed subject.

8. The information processing system according to claim 1, wherein
the at least one displayable code image is a code image formed by a one-dimensional code or a multi-dimensional code, and
the first display device of the third information processing apparatus displays the at least one displayable code image of the one-dimensional code or the multi-dimensional code, based on the code image data.

9. The information processing system according to claim 8, wherein
the code image generator generates a plurality of the displayable code images, and
the first display device of the third information processing apparatus sequentially displays the plurality of the displayable code images in a predetermined order, based on the code image data.

10. The information processing system according to claim 1, further comprising a server capable of communicating with the first information processing apparatus, the second information processing apparatus, and the third information processing apparatus, wherein
the first information processing apparatus further includes a transmitter that transmits, to the server, the data in the first format, and the code image data in the second format,
the server includes a data store that stores the data in the first format and the code image data in the second format which are transmitted by the transmitter,
the second information processing apparatus further includes a first receiver that receives, from the server, the data in the first format which is stored in the data store,
the information processor performs the stereoscopic information processing based on the data in the first format which is received by the first receiver without requiring decoding of the code image,
the third information processing apparatus further includes a second receiver that receives, from the server, the code image data in the second format which is stored in the data store, and
the first display device displays the at least one displayable code image, based on the code image data in the second format which is received by the second receiver.

11. An information processing method used by an information processing system comprising a first information processing apparatus, a second information processing apparatus, and a third information processing apparatus,
the information processing method of the first information processing apparatus including:
storing stereoscopic data in a first format which can be processed by the first information processing apparatus and the second information processing apparatus; and
transforming the stereoscopic data in the first format into at least one displayable code image by using a predetermined encoding mode, and generating code image data in a second format which can be processed by a general-purpose device including the third information processing apparatus,
the second information processing apparatus performing stereoscopic information processing based on the stereoscopic data in the first format without displaying the code image, and
the third information processing apparatus displaying the at least one displayable code image by a first display device, based on the code image data in the second format.

12. A non-transitory computer-readable storage medium having stored therein an information processing program executed by a computer processor of a first information processing apparatus, a second information processing apparatus, and a third information processing apparatus, respectively, which are included in an information processing system,
the information processing program causing the computer processor of the first information processing apparatus to:
store stereoscopic data in a first format which can be processed by the first information processing apparatus and the second information processing apparatus; and
transform the stereoscopic data in the first format into at least one displayable code image by using a predetermined encoding mode, and generating code image data in a second format which can be processed by a general-purpose device including the third information processing apparatus, the information processing program causing the computer of the second information processing apparatus to function as an information processor performing stereoscopic information processing based on the data in the first format without displaying the code image, and the information processing program causing the computer of the third information processing apparatus to display the at least one displayable code image by a first display device, based on the code image data in the second format.

* * * * *